(12) United States Patent
Szilagyi et al.

(10) Patent No.: US 10,447,558 B2
(45) Date of Patent: Oct. 15, 2019

(54) MEASUREMENT COORDINATION IN COMMUNICATIONS

(71) Applicant: NOKIA SOLUTIONS AND NETWORKS OY, Espoo (FI)

(72) Inventors: Peter Szilagyi, Budapest (HU); Csaba Vulkan, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 128 days.

(21) Appl. No.: 15/535,779

(22) PCT Filed: Dec. 15, 2014

(86) PCT No.: PCT/EP2014/077725
§ 371 (c)(1),
(2) Date: Jun. 14, 2017

(87) PCT Pub. No.: WO2016/095943
PCT Pub. Date: Jun. 23, 2016

(65) Prior Publication Data
US 2017/0346705 A1    Nov. 30, 2017

(51) Int. Cl.
*G06F 15/16* (2006.01)
*H04L 12/24* (2006.01)
(Continued)

(52) U.S. Cl.
CPC ...... *H04L 41/5067* (2013.01); *H04L 41/0823* (2013.01); *H04L 43/08* (2013.01);
(Continued)

(58) Field of Classification Search
CPC . H04L 41/5067; H04L 41/0823; H04L 43/08; H04L 43/0829; H04L 43/12;
(Continued)

(56) References Cited

U.S. PATENT DOCUMENTS 7,496,674 B2 * 2/2009 Jorgensen ................ H04L 1/20
709/230
7,765,294 B2 * 7/2010 Edwards ........... H04L 29/06027
709/224

(Continued)

FOREIGN PATENT DOCUMENTS

EP    1 304 831 A2    4/2003
JP    2007336512 A    12/2007
(Continued)

OTHER PUBLICATIONS

"3rd Generation Partnership Project . . . Concept and Requirements (Release 12)," 3GPP Draft; 32401-C00, 3rd Generation Partnership Project (3GPP), Mobile Competence Centre; Oct. 2, 2014; XP050907300. (Year: 2014).*

(Continued)

*Primary Examiner* — Melvin H Pollack
(74) *Attorney, Agent, or Firm* — Squire Patton Boggs (US) LLP

(57) ABSTRACT

A method comprises analysing (110), in a network node, data flows related to a terminal device of a communication system, in order to detect data flows having at least one predefined characteristic. The network node selects (111) the data flows having the at least one predefined characteristic, as significant data flows on which customer experience CE measurements are to be performed.

19 Claims, 12 Drawing Sheets

(51) Int. Cl.
  *H04L 12/26* (2006.01)
  *H04W 28/02* (2009.01)
  *H04L 12/851* (2013.01)
  *H04L 12/841* (2013.01)
  *H04W 24/02* (2009.01)
(52) U.S. Cl.
  CPC .......... *H04L 43/0829* (2013.01); *H04L 43/12* (2013.01); *H04L 47/2483* (2013.01); *H04L 47/28* (2013.01); *H04W 24/02* (2013.01); *H04W 28/0236* (2013.01); *H04W 28/0284* (2013.01); *H04L 43/0858* (2013.01); *H04L 43/106* (2013.01)
(58) Field of Classification Search
  CPC . H04L 47/2483; H04L 47/28; H04L 43/0858; H04L 43/106; H04W 24/02; H04W 28/0236; H04W 28/0284
  USPC ........................................................ 709/224
  See application file for complete search history.

(56) References Cited

U.S. PATENT DOCUMENTS

| | | | | |
|---|---|---|---|---|
| 7,983,241 | B2* | 7/2011 | Furuskar | H04W 48/18 370/352 |
| 8,238,253 | B2* | 8/2012 | Morrill | H04L 41/5009 370/241 |
| 8,549,135 | B1* | 10/2013 | Yazdani | H04L 47/35 709/224 |
| 8,660,008 | B2* | 2/2014 | Babiarz | H04L 41/5019 370/235 |
| 8,717,911 | B2* | 5/2014 | Bugenhagen | H04L 12/14 370/252 |
| 8,792,347 | B2* | 7/2014 | Swenson | H04L 47/11 370/232 |
| 8,935,389 | B2* | 1/2015 | Pedigo | H04L 43/12 709/208 |
| 8,972,568 | B2* | 3/2015 | Arvidsson | H04L 41/5025 709/224 |
| 8,989,113 | B2* | 3/2015 | Mukherjee | H04W 74/0833 370/329 |
| 9,119,109 | B1* | 8/2015 | Dubrovsky | H04W 28/16 |
| 9,325,587 | B2* | 4/2016 | Groenendijk | H04L 41/5032 |
| 9,357,469 | B2* | 5/2016 | Smith | H04M 15/60 |
| 9,398,473 | B2* | 7/2016 | Goerke | H04W 24/02 |
| 9,414,094 | B2* | 8/2016 | Van Zijst | H04L 47/125 |
| 9,479,341 | B2* | 10/2016 | Bugenhagen | H04L 12/14 |
| 9,557,889 | B2* | 1/2017 | Raleigh | G06F 3/0482 |
| 9,577,906 | B2* | 2/2017 | Ferreira | H04L 43/0876 |
| 10,129,123 | B2* | 11/2018 | Tsuruoka | H04L 43/106 |
| 2008/0049639 | A1* | 2/2008 | Wiley | H04L 41/18 370/252 |
| 2013/0021933 | A1* | 1/2013 | Kovvali | H04W 88/18 370/252 |
| 2014/0254380 | A1* | 9/2014 | Swenson | H04L 47/11 370/235 |
| 2014/0351442 | A1* | 11/2014 | Fernandez-Palacios | H04L 41/0896 709/226 |
| 2015/0295808 | A1* | 10/2015 | O'Malley | H04L 47/22 709/224 |

FOREIGN PATENT DOCUMENTS

| | | |
|---|---|---|
| JP | 2010537476 A | 12/2010 |
| WO | 2006043624 A1 | 4/2006 |

OTHER PUBLICATIONS

Martin Zadnik: "Network Monitoring Based on IP Data Flows," Mar. 24, 2010 (retrieved 2011), pp. 1-24, XP002620705. (Year: 2011).*
International Search Report & Written Opinion dated Aug. 27, 2015 corresponding to International Patent Application No. PCT/EP2014/077725.
3GPP TS 32.401 V12.0.0 (Oct. 2014), Technical Specification, 3rd Generation Partnership Project; Technical Specification Group Services and System Aspects; Telecommunication management; Performance Management (PM); Concept and requirements (Release 12), Oct. 2, 2014, XP050907300.
Martin Zadnik, "Network Monitoring Based on IP Data Flows," Internet Citation, Mar. 24, 2010, pp. 1-24, XP002620705.
Oct. 1, 2018 Office Action issued in Japanese Patent Application No. 2017-532030.
Korean Office Action application No. 10-2017-7019760 dated Dec. 1, 2018.
Korean Office Action corresponding to Appln. No. 10-2017-7019760, dated Jun. 18, 2019.
European Office Action corresponding to Appln. No. 14 812 730.1, dated Aug. 12, 2019.
Baek-Young Choi, et al., "Adaptive Packet Sampling for Accurate and Scalable Flow Measurement", IEEE Commjnications Society, Globecom 2004, vol. 3, Nov. 29, 2004, pp. 1448-1452, XP010757763.

* cited by examiner

US 10,447,558 B2

MEASUREMENT COORDINATION IN COMMUNICATIONS

TECHNICAL FIELD

The invention relates to communications.

BACKGROUND

Quality of experience (QoE) is a measure of the overall value of a service provided from a user's perspective. QoE takes into consideration various factors that contribute to overall user value, such as suitableness, flexibility, mobility, security, cost, personalization and/or choice.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following, the invention will be described in greater detail by means of preferred embodiments with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
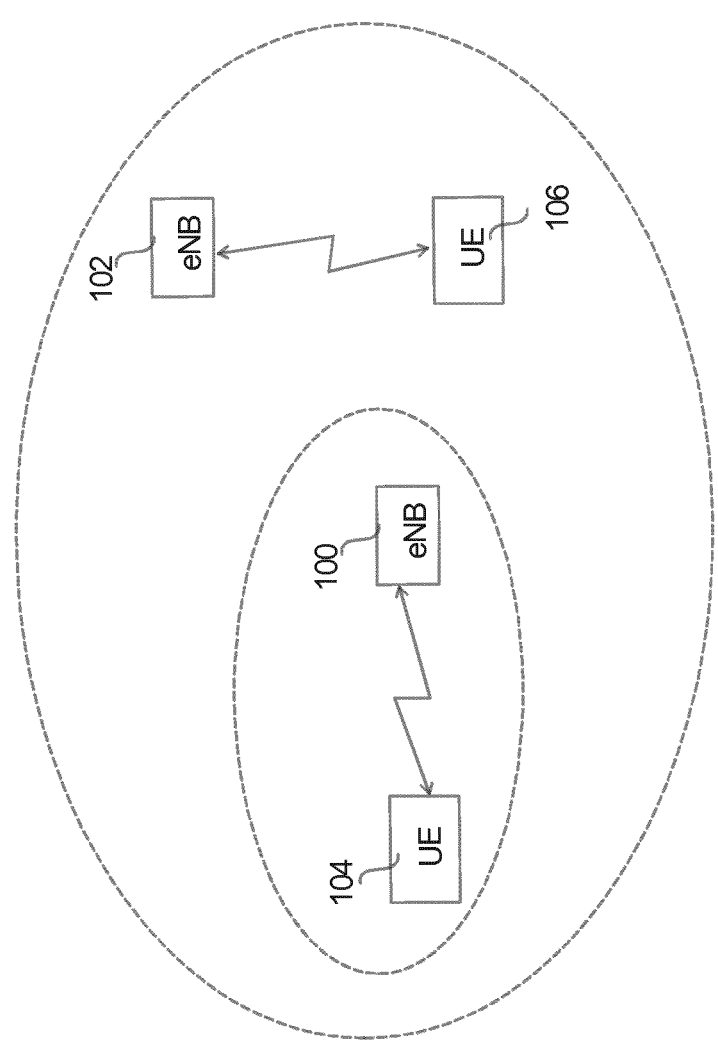
FIG. 1 illustrates a wireless communication system to which embodiments of the invention may be applied.

FIG. 1 illustrates a wireless communication scenario to which embodiments of the invention may be applied. Referring to FIG. 1, a cellular communication system may comprise a radio access network comprising base stations disposed to provide radio coverage in a determined geographical area. The base stations may comprise macro cell base stations (eNB) 102 arranged to provide terminal devices (UE) 106 with the radio coverage over a relatively large area spanning even over several square miles, for example. In densely populated hotspots where improved capacity is required, small area cell base stations (eNB) 100 may be deployed to provide terminal devices (UE) 104 with high data rate services. Such small area cell base stations may be called micro cell base stations, pico cell base stations, or femto cell base stations. The small area cell base stations typically have significantly smaller coverage area than the macro base stations 102. The cellular communication system may operate according to specifications of the $3^{rd}$ generation partnership project (3GPP) long-term evolution (LTE) advanced or its evolution version.

Figure 2:
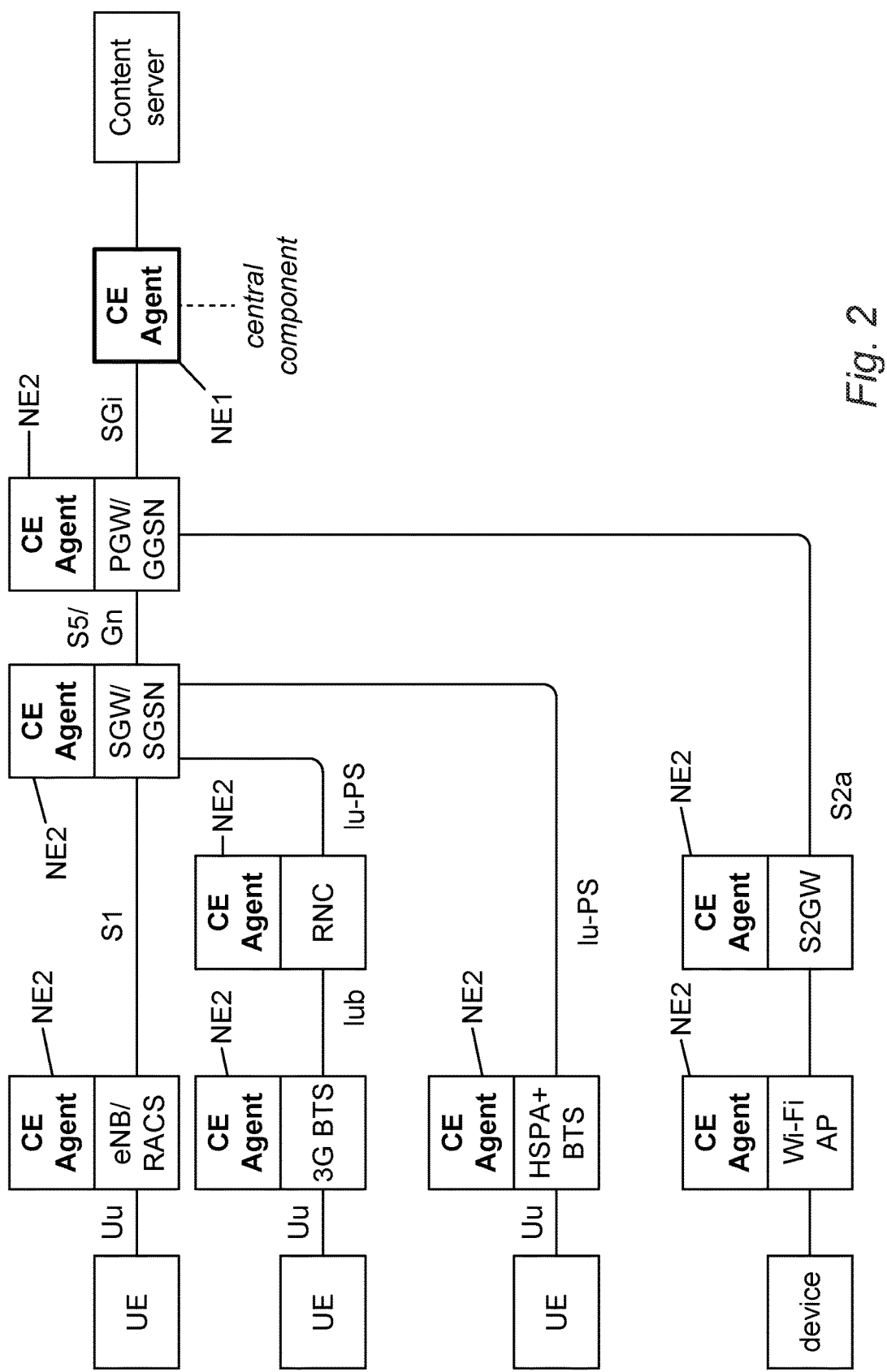
FIG. 2 illustrates deployment options for a customer experience agent.

Automatic and accurate network monitoring enables efficient network operation including anomaly detection, problem localization, root cause analysis and traffic/QoS/QoE management actions. Such functions require a correlated insight to user behaviour, attributes of application sessions, customer experience and network status (both local and end-to-end). The correlated insight is obtained by collecting and/or measuring relevant user, application and/or QoE specific data and KPIs (such as user actions, application specific metadata, download time, application level latency, video staling, time to play, etc.) and QoS KPIs (such as throughput, RTT, delay, jitter, packet loss, TCP time-outs, packet discard patterns, etc.). While the subset of these measurements may be collected at a (logically) single monitoring agent, the collection of localized insight (i.e. corresponding to dedicated network segments such as the radio interface) and to enhance the set of KPIs with collaborative measurements (e.g. measurement of one-way delays) require a distributed measurement system with monitoring entities deployed at multiple locations, for example, both in a radio access network and core network. FIG. 2 illustrates an implementation that uses customer experience (CE) agents that monitor user plane packets at multiple locations and may use in-band header enrichment for collaborative measurements and status updates among the agents. Such a setup ensures that QoE insight may be natively correlated with accurate network status information including congestion localization information, which is a prerequisite of proper network side analytics, decisions and actions including QoE enforcement.

In case of a distributed measurement system consisting of both radio access network and core network based agents, each monitoring agent may be implemented as a full blown CE agent executing each of the functionalities and collecting as many measurements as possible. While this provides the maximum accuracy of the measurements and calculations, collecting and analysing as many samples as possible may not be computationally feasible (in case of resource limited deployments such as embedded platforms) or may not be required (in case the analytics and actions do not require or benefit from such high accuracy). Additionally, in resource limited scenarios special low-overhead measurement techniques may be required instead of full blown standalone packet monitoring and flow, protocol and application level analytics.

Existing measurement systems are targeting network management and QoS quantification/qualification use cases.

No scalable measurement solutions are available for QoE management. That is, the existing measurement systems are not able to support real time QoE management of both traditional telecommunication and OTT applications, as they do not provide granular and correlated user, application, QoE and network side insight in real time. The existing measurement systems collect higher level interface logs (e.g. cell trace), average/aggregate KPIs over measurement windows thus lack flow/application level insight, etc. Real-time QoE measurements, especially in case of OTT applications, require packet level monitoring of the traffic where not only the amount of data is measured but the information extracted from protocol headers and metadata is used to create relevant KPIs. Virtually, these KPIs are updated after each packet is passing through a measurement agent. Existing techniques produce a relatively small amount of measurement data that does not depend on the number of packets or flows that generate system load. Existing packet based measurement mechanisms such as TWAMP are injecting a few artificially created packets into the user plane and perform measurements on these packets. However, as these techniques are not even targeting the user packets, they are not capable of providing flow and application insight that is required for the QoE management.

In contrast, the real time QoE measurement systems and mechanisms require closed monitoring of user data in order to detect transient degradation (as the ultimate scope of the QoE management is to prevent or resolve degradation before degradation causes poor user experience). Therefore the packets generated by a given application are intercepted, their protocol header content and the protocol metadata they carry is extracted in order to obtain the relevant KPIs such as RTT, packet retransmissions, packet discards, media rate, content resolution, object sizes, etc. Additionally, in order to enable the localization of the anomalies, multiple measurement agents are to exist in each end-to-end path within the system, and this distributed measurement is to allow low cost communication of the corresponding measurement agents. The most efficient communication (from both data volume and latency agent point of view) is the in-band header enrichment, i.e, the extension headers of the user plane packets themselves are enriched with information or commands the measurement agents exchange.

In a distributed measurement system with packet based measurement execution and in-band communication, every packet and every flow is by default an opportunity to perform a measurement or piggyback a piece of data towards a peering measurement entity. Therefore, the number of measurement samples generated, the communication overhead and the processing requirement in the measurement agents increase with the amount of traffic and the number of flows they are monitoring. As long as there are sufficient processing resources, the measurement systems are able to deliver the maximum number of measurements and achieve the highest accuracy and statistical confidence in evaluating or aggregating the measurements. Also they are able to do measurements on every flow of each application.

In case the measurement agent is an embedded system with limited resources (such as a remote radio head, router board, low clocked network processor, etc.), it may not be able to handle each packet and flow with such a measurement density. On the other hand, the participation of such measurement agents in the distributed measurement system is required, as due to their location (e.g. being close to the radio), they are able to deliver unique measurements invaluable for anomaly/congestion detection/localization and QoE management.

Even if the maximum number of possible measurements is collected (as for the available processing resources), there still may not be any benefit from having that much data. In case the analytics and action based on them does not require it, higher accuracy and more measurements are only wasting resources.

Figure 3:
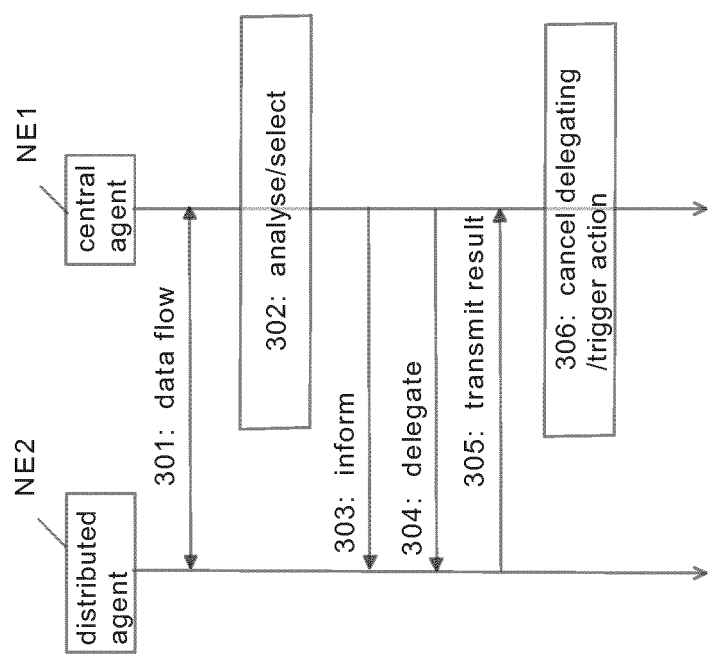
FIG. 3 is a signalling diagram of a procedure for measurement coordination according to an embodiment of the invention.

Let us now describe an embodiment of the invention for central QoE orchestration with reference to FIG. 3. FIG. 3 illustrates a signalling diagram illustrating a method for communicating customer experience CE parameters between network elements of the cellular communication system. The network element may be a network node, an access node, a base station, a terminal device, a server computer or a host computer. For example, the server computer or the host computer may generate a virtual network through which the host computer communicates with the terminal device. In general, virtual networking may involve a process of combining hardware and software network resources and network functionality into a single, software-based administrative entity, a virtual network. In another embodiment, the network node may be a terminal device. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to the software containers on a single system. Virtual networking may also be used for testing the terminal device.

Referring to FIG. 3, in item 301, an application session may be started for a terminal device, and a corresponding data flow may be transmitted within the application session in the system. In step 302, the data flow is analysed by a network node NE1 such as a central CE agent (the data flow is transmitted to or from the terminal device, and the network node NE1 is able to receive the data flow transmitted in the system). The central CE agent may be a separate entity connected to the network, or the central CE agent may be integrated to another network node (such as SAE-GW in the LTE/LTE-A system). If, based on the analysing 302, the network node NE1 detects, in step 302, that a data flow 301 has a predefined flow characteristic, the network node NE1 selects 302 the data flow having the predefined characteristic as a significant data flow on which customer experience CE measurements are to be performed. The predefined flow characteristic may include, for example, the large amount of data to be transmitted within the data flow, long flow length, and/or the flow belonging to an important application.

In item 303, the network node NE1 may inform another network node (other network nodes) NE2 (such as distributed CE agent(s)) on the significant data flow(s) on which customer experience CE measurements are to be performed. The informing may include, for example, the network node NE1 marking (e.g. enriching) respective packets or flows. In item 303, the network node NE1 may also provide information such as traffic monitoring information, protocol level packet interpretation information, measurement context detection information, measurement scheduling information, and/or measurement execution information to the distributed CE agent(s), in order the distributed CE agent(s) NE2 to be able to perform relevant customer experience CE measurements. Based on receiving the information 303, the distributed CE agent NE2 is configured to perform the customer experience CE measurements on the one or more significant data flows (not shown in FIG. 3).

In item 304, the network node NE1 may (statically or dynamically) delegate analytics responsibilities among CE agents to balance computational load. In item 304, the network node NE1 may also delegate actions and analytics responsibilities to distributed CE agents in order local QoS management, QoE management, traffic management, congestion control etc. to be performed at the proximity of managed resources. In item 305, a distributed CE agent may transmit information on an analytics result. In step 306, the network node NE1 may receive, from the distributed CE agent, information on the analytics or actions, and based on the receiving, trigger a QoE management action in the central CE agent or cancel delegation of the actions and/or analytics responsibilities to the distributed CE agent.

Herein, marking may refer to changing a value of selected, already existing bits in a packet header in order to indicate a desired state, and enriching may refer to inserting of additional (e.g. structured) data into the packet header. However, other interpretations of the terms marking and/or enriching are also possible.

In an embodiment, the CE measurements are intelligently scaled so that the CE measurements are able to meet any given target accuracy (e.g. the number of samples per time window) on various aggregation levels (e.g. per flow, per cell, per DSCP aggregate, etc.). The measurement agents are made a useful part of the distributed measurement system. A scalable centralized/distributed CE agent measurement coordination is provided with adaptive responsibility delegation. The scalability of the measurements is ensured by adapting the measurement density to the volume of the monitored traffic and the load of the nodes executing the measurements. In order to enable lightweight measurement implementation at radio access nodes with limited resources, the central CE agent may explicitly mark the packets on which measurements are to be performed and enrich these packets with additional context to eliminate the requirement for protocol level flow monitoring at other locations. Additionally, the centralized and distributed CE agents may dynamically delegate responsibilities and functionalities among each other, i.e. transfer the QoE monitoring from the core network to the edge (radio) nodes or vice versa and distribute only the results to other nodes (if needed). This enables to keep each measurement active, corresponding to each relevant flow or application within the distributed CE agents as a system even in case the computational load at specific locations does not enable running each of the functionalities.

In an embodiment, the execution and collection of user, application, QoE, network side QoS or any other measurements are coordinated in a distributed measurement system. An embodiment is applicable to any measurement system that has multiple cooperating measurement agents deployed at various network locations, either as software agents running at or attached to network elements or as standalone middle boxes. The agents perform measurements on the user plane packets and flows themselves to generate the required level and granularity of the insight. Specific status and/or measurement information may be exchanged in order to increase the accuracy and/or level of detail of the insight collected from the network. An embodiment is applicable to the deployment of cooperative CE agents in LTE and beyond (5G), 3G/HSPA, Wi-Fi, ISP, multi-radio heterogeneous networks and/or other packet networks, for example. Due to the characteristics of the mobile systems, the measurement system may have a star topology where the central CE agent is logically connected with each measurement agent at the radio nodes. Thus in case of an end-to-end instance (a logical link within the measurement topology) both the central entity and the radio node side entity are able to collect the same insight, and through the cooperative measurements they are able to share sufficient information to enable efficient analytics at any of the nodes. The central component executes measurements, analytics and actions (such as QoE enforcement) whereas the distributed agents support the execution of the measurements.

Figure 4:
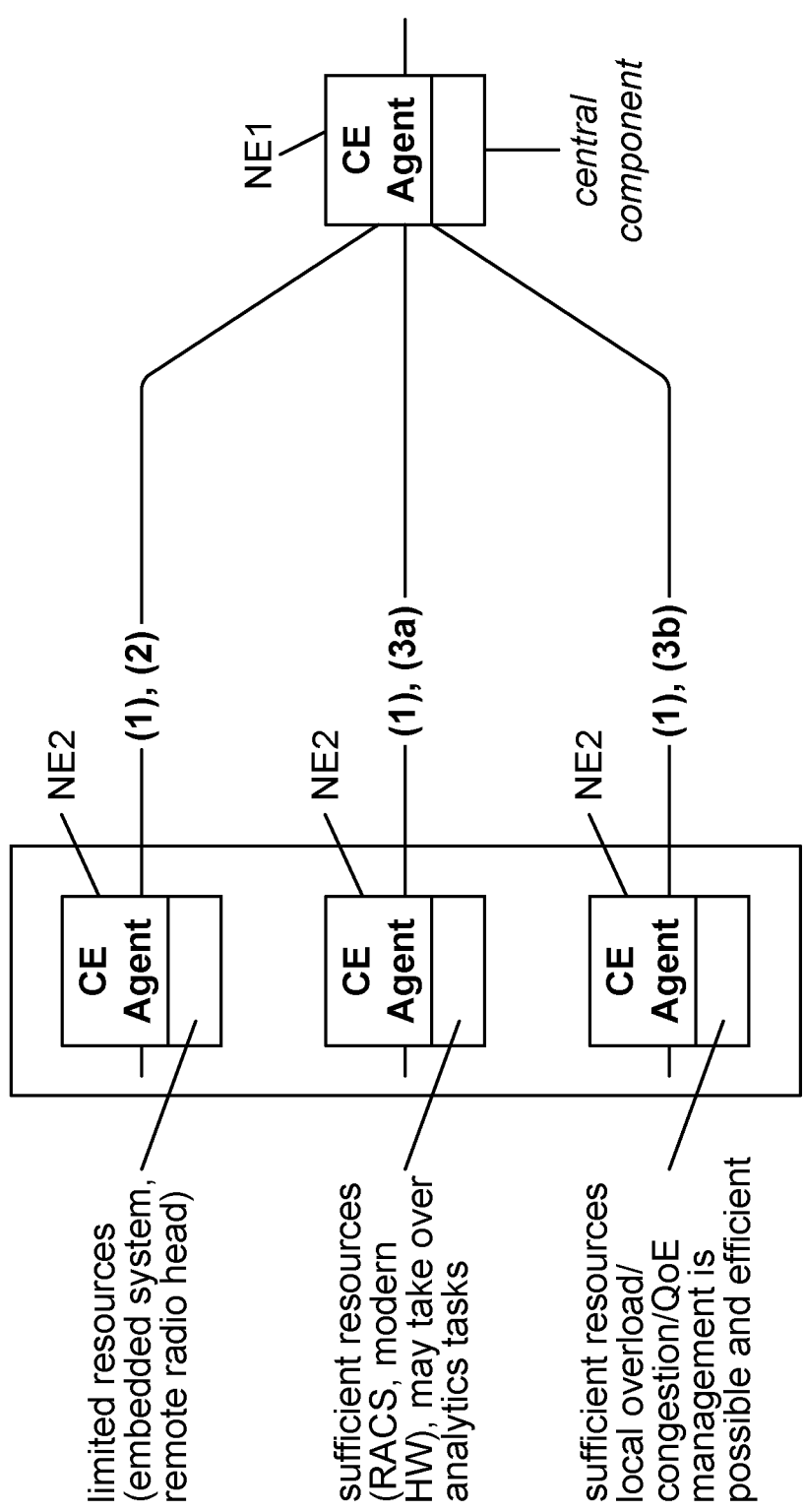
FIG. 4 illustrates distributed customer experience agent based measurement system.

In an embodiment, the operation of the distributed measurement system is enhanced by a scalable measurement method requiring the same processing resources regardless of the amount of traffic the system is to handle. This is achieved through preconfigured target measurement accuracy with the minimum number of measurements (and thus the minimum measurement overhead). A mechanism is provided for handling measurement agents with limited computational resources incapable of supporting complex logic and detailed packet monitoring (required for the measurements) on their own. This allows the system to collect required data from each relevant network element. A mechanism is provided for dynamically delegating tasks, functionalities and responsibilities among the measurement agents. The types of delegation include 1) delegating analytics responsibilities to balance the computational resources (load) of the nodes running the agents, and 2) delegating both analytics and actions to distributed nodes to perform local QoS/QoE/traffic management and congestion control actions efficiently at the proximity of the managed resources. The distributed CE agent based measurement system is illustrated in FIG. 4.

In an embodiment, the scalability of the measurements is achieved by selecting only those flows that transmit a significant amount of data, have long flow length and/or belong to important applications, while excluding short transient flows from the measurements. This selection already limits the amount of flows and packets that are to be monitored to perform measurements. Additionally, a target number of measurement samples is introduced over a given time interval and a given KPI (e.g. delay, RTT, etc.) or aggregation level (e.g. per flow, per bearer/application, per QCI/DSCP class, per cell, per eNB, etc.). The target number is derived from the required level of accuracy and is use case dependent. Thus insignificant data flows may be at least partly excluded from the customer experience CE measurements.

Figure 5:
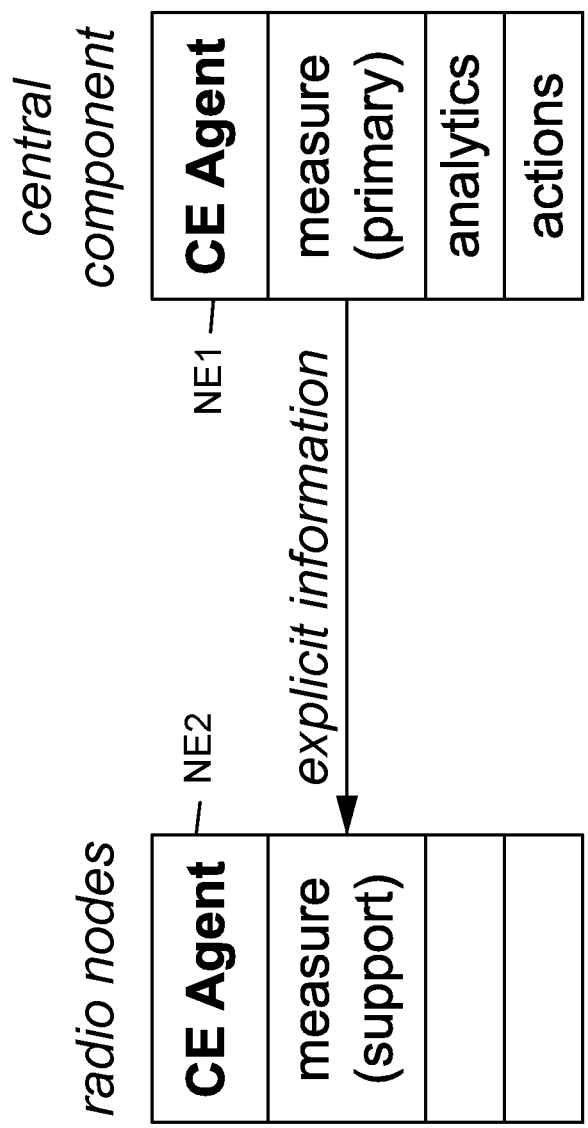
FIG. 5 illustrates centrally assisted measurement at the distributed measurement agent.

In an embodiment, having the measurement agent at strategic locations of the end-to-end path (e.g. at eNBs and the core network) enables granular network side insight collection and congestion localization. However, the amount of available computational resources at the radio nodes may significantly limit the level of contribution of the radio nodes to the detailed, in context end-to-end measurements. Particularly, supporting the central entity with the measurements requires the capabilities of unassisted traffic monitoring, protocol (e.g. TCP/IP) level packet interpretation, measurement context detection and measurement scheduling/execution at the distributed measurement agents. In such cases, in order to limit the computational overhead the radio nodes are to handle, the central entity assists the radio nodes by providing straightforward information for targeted measurements. FIG. 5 illustrates centrally assisted measurement at the distributed measurement agent.

In an embodiment, responsibility delegation between the central and distributed measurement agents is enabled. The delegation may involve analytics delegation as overload management at the central component, and/or enabling localized analytics and actions to be run efficiently at the distributed measurement agents. The term analytics may herein refer to analysis procedures such as QoE measurements, overload detection, overload localization, QoE and network status correlation, etc. The term action may herein refer to QoE management including actions such as QoE enforcement, TCP optimization, congestion control, QCI/SPI change, real time/active mode TS/Wi-Fi offload, etc.

Figure 6:
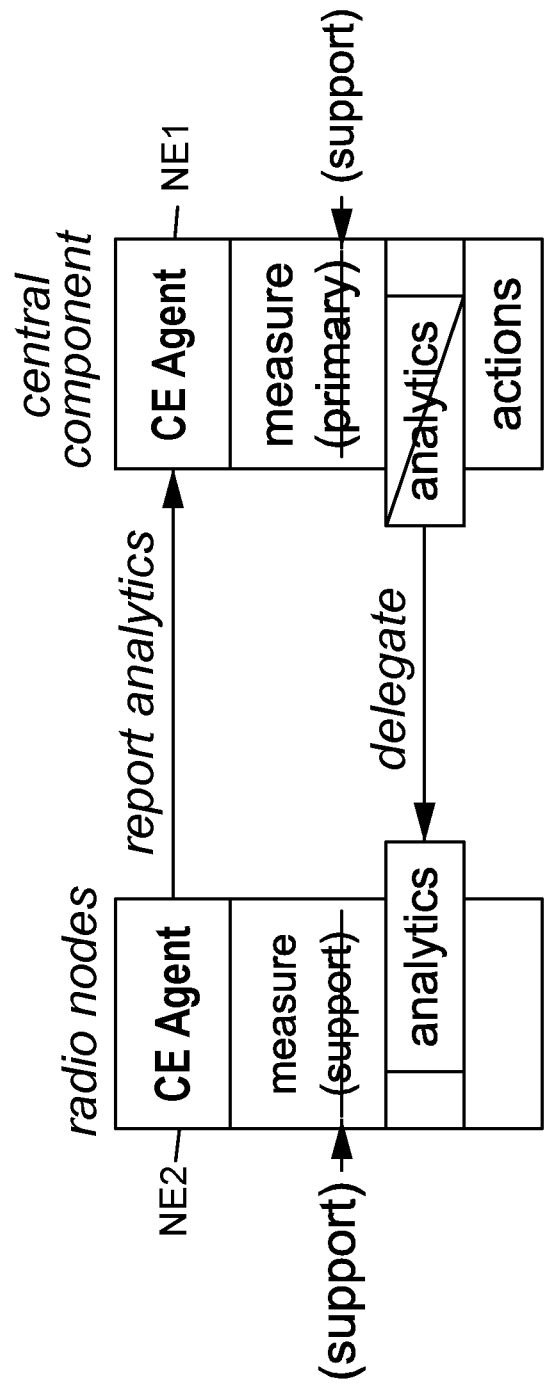
FIG. 6 illustrates load based analytics delegation.

Load based analytics delegation transfers the analytics tasks from a central component to the distributed measurement agent. In the transferred analytics, the distributed measurement agent monitors traffic (e.g. the traffic of eNB). In that case, the central component retains a supporting role with the end-to-end measurements, whereas the distributed measurement agent performs the analytics (including QoE measurement, overload detection and localization, and/or QoE and network status correlation). A radio side component continuously informs the central component about the result of the analytics, so that the central component is able to trigger actions. The load based analytics delegation is illustrated in FIG. 6. The decision for the analytics delegation is based on a load threshold that limits the amount of computational resources the central component may consume. If the threshold is reached, the central component starts delegating analytics to the distributed measurement agents. The condition of the delegation is that a target measurement entity is capable of handling the analytics and has the required computational resources at its disposal.

Figure 7:
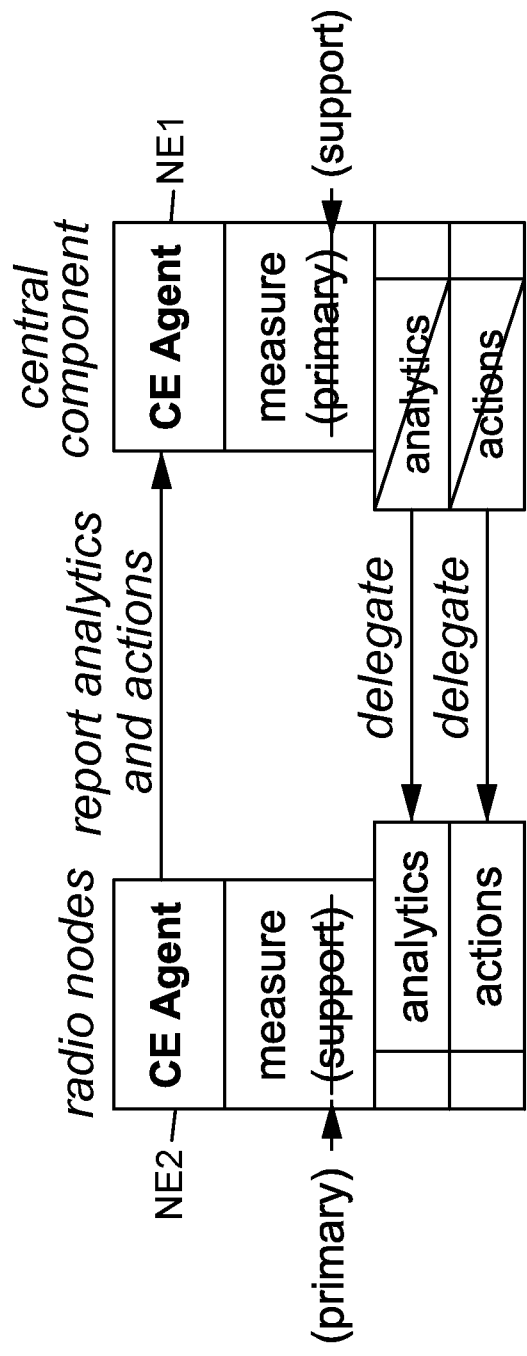
FIG. 7 illustrates analytics and action delegation.

Certain network side anomalies or degradations (such as permanent radio side congestion) may be managed optimally from the proximity of the anomaly/degradation, i.e. by the monitoring agent located at the radio access node. The central entity may delegate both analytics and action responsibilities to be run locally at the distributed nodes (see FIG. 7). The delegation is static (permanent) in case network topology and network configuration guarantee that congestion may only occur at the radio network side in the context of a given radio access node (e.g. a dedicated fiber connection of eNB to the core network). Alternatively, the delegation is dynamic, if the actions are not to be performed from the edge every time. The dynamic delegation is triggered in case the distributed actions are effective (e.g. the beginning of the radio overload) and the delegation is reversed by the central entity when core network side actions become necessary. In any case, the distributed entity continuously informs the central entity about the operation (analytics and actions) of the distributed entity to enable the central entity to have a full view in the network status and ongoing actions.

In an embodiment, context and network status based scalable measurement scheduling is provided to restrict the QoE measurement only to a relevant subset of the flows and maintain target measurement accuracy on the flow or flow aggregate (e.g. application, user, etc.) level, achieving minimal execution and communication overhead. Resource limited distributed measurement agents are centrally orchestrated and commanded by externally providing the trigger and optionally an additional input/context for the measurement. A lightweight stateless measurement apparatus may be implemented at the distributed locations (e.g. in the radio access nodes) with limited resources, while preserving their contribution to the overall insight generation. Dynamic and adaptive centralized-distributed load sharing and responsibility delegation is performed to enable the sustainable operation of each monitoring agent while preserving full capabilities of the measurement system as a whole. Additionally, the delegation of the analytics and actions to distributed measurement agents enables the local QoE enforcement actions to be executed more optimally in the proximity of the congestion or anomalies.

In an embodiment, the measurements are limited to a set of selected flows (a straightforward selection criteria is a flow length or being a representative flow of an application), and a subsequent mechanism is given to limit the number of measurements per time interval. Both are efficient ways to enforce scalability. Limiting the measurements to selected flows is enabled by the flow and application level insight derived from the user plane packet headers and application metadata. Based in this insight, the CE agent is able to detect or predict the amount of data a given connection is likely to transmit, and thus the CE agent is able to separate long flows (transmitting a large amount of data) and short flows. In case the HTTP headers are available (non-encrypted traffic), a HTTP response content-length header field indicates the amount of data the next downloaded object is going to carry. Alternatively, identifying the web page or the type of the web page (e.g. multimedia/picture heavy content) also gives an expectation of a significant amount of traffic. Such connections are suitable for longer term measurements, whereas flows that are in a keep-alive mode or transmit only minimal data (e.g. periodic check-in and status updates to social network sites) may be excluded from certain types of measurements and their status may be inferred from the measurements obtained from heavy flows sharing the same end-to-end path.

In an embodiment, based on the business logic consuming or acting upon the measurements, certain type of traffic (based on a transport protocol, application identity, content, user, etc.) may be overall excluded from specific (e.g. QoE) measurements. The CE agent has the ability of identifying the traffic and enforcing such policies to focus the measurements only to traffic of interest.

Figure 8:
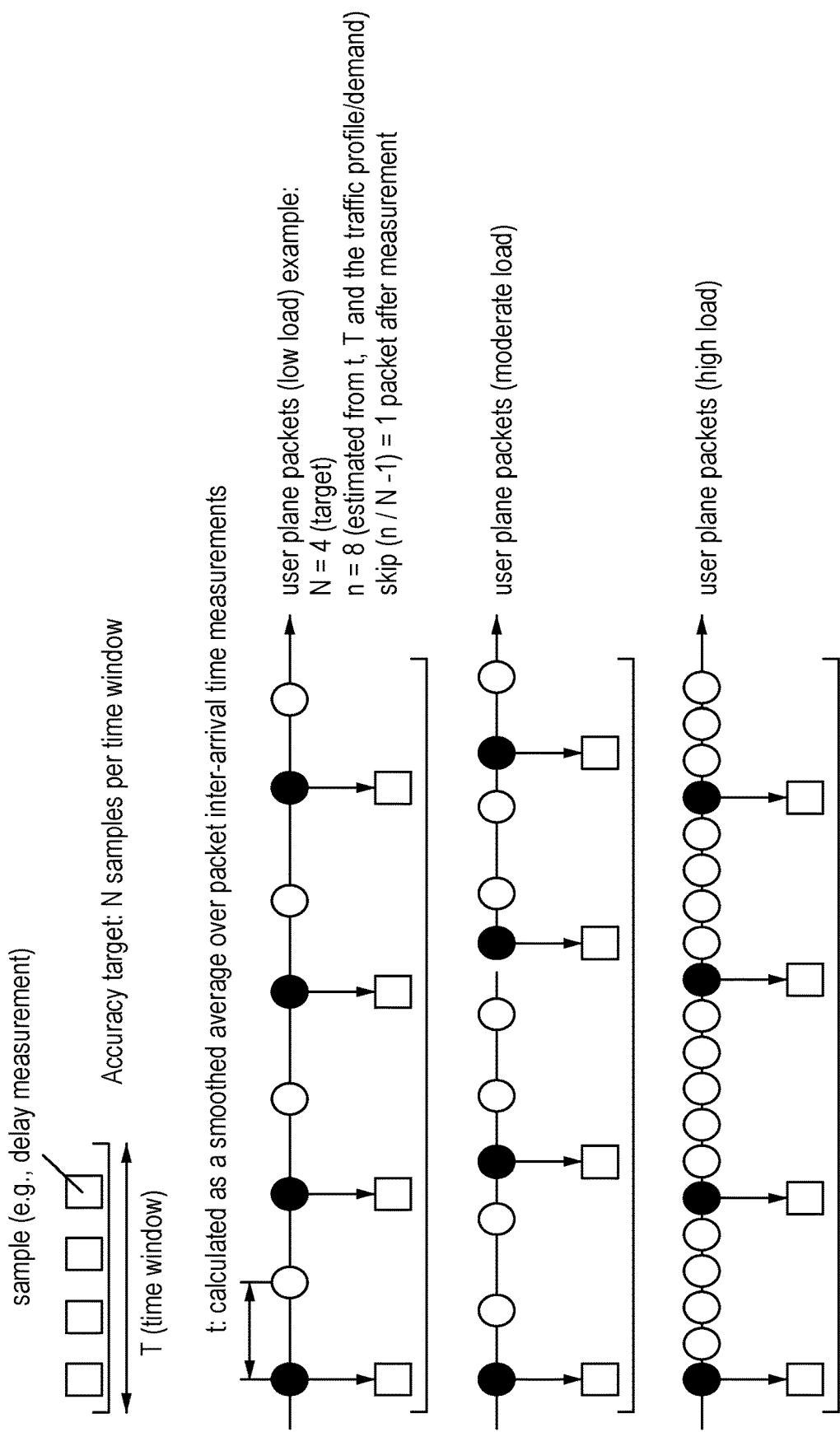
FIG. 8 illustrates scalability of measurements.

In an embodiment, once a flow is selected for the measurement, the measurements of the individual packets of the flow are limited according to the accuracy target defined for the flow. The accuracy target indicates the number of measurement samples (N) to be collected from the flow during a given time window (T). The selection of the individual packets to be measured is performed so that the measurements are distributed evenly (i.e. paced) in time within the measurement window (see FIG. 8) instead of simply measuring the first N packets that arrive in the time window. Pacing the measurements is achieved by monitoring the average inter-arrival time (t) of the packets, so that the number of expected packets in the next window is given by n=T/t. In case n is smaller than N, each packet needs to be measured to get as close as possible to the target accuracy. In case n>N, the number of enriched packets is N (i.e. the target accuracy) and after measuring a packet, the next n/N−1 packets are bypassed.

In an embodiment, alternatively or in addition to per flow accuracy targets, aggregate based targets (e.g. the number of samples per DSCP or QCI class, etc.) may also be defined. In that case, each flow selected for the measurement and matching the aggregation criteria is handled cumulatively when the target accuracy is enforced. This includes the measurement of the inter-arrival time of the packets in the cumulative aggregate of the flows as well as selecting the next packet for measurement.

In order to cope with scarce resources at the distributed measurement agents (e.g. at eNB), the central CE agent explicitly commands the measurements and provides the required contextual information along with the packets that is to be subject of the measurements through explicit marking. In the LTE system, network side KPIs include the radio side RTT, the one-way DL and UL delays on the S1 interface and the detection of DL S1 packet loss. These measurements enable the detection and localization of congestion on the transport network (separately in the UL or DL direction) or on the radio interface. Measuring the radio side RTT normally requires the eNB side CE agent to follow and correlate DL TCP segments with UL TCP ACKs in the same flow. This requires creating a per-flow context with IP address and port pairs as identifiers, recording when a matching packet with a given sequence number is observed in the DL direction and finding out if TCP ACK that acknowledges the given segment is received in UL. Additionally, duplicate ACKs and retransmitted data segments are to be excluded from the RTT measurement. This requires TCP protocol level understanding from the eNB side CE agent. In an embodiment, however, the core side CE agent is able to infer the radio side RTT implicitly by measuring the system side RTT (i.e. between UE and itself) and subtracting S1 RTT (i.e. the sum of the S1 DL and UL delays) from it. Therefore, the eNB side CE agent may be more lightweight by dropping the requirement of radio side RTT measurement altogether while still maintaining the same level of insight and capability of the overall measurement system.

Figure 9:
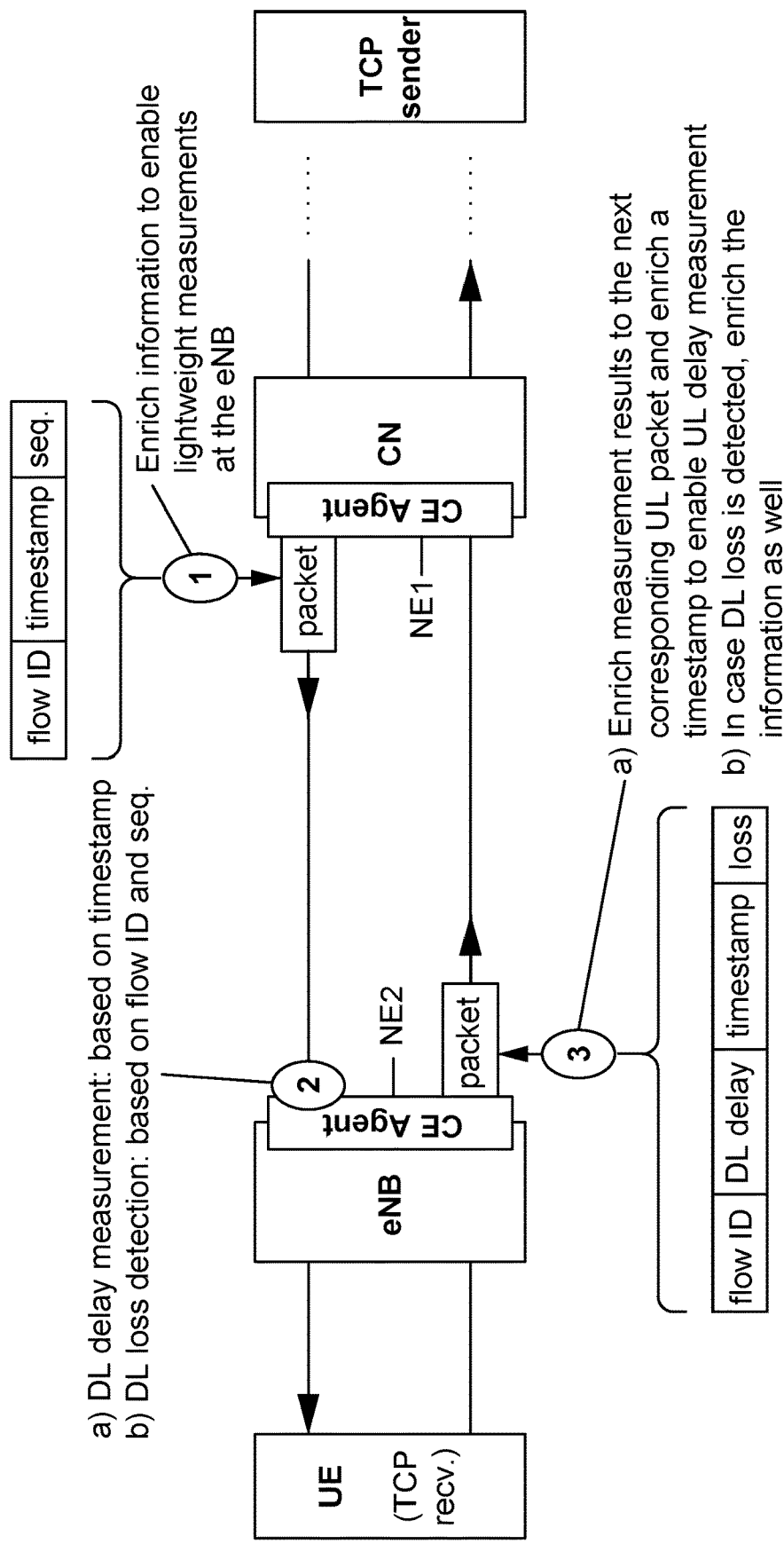
FIG. 9 illustrates central measurement orchestration.

Due to the remaining one-way delay measurement, the core network side and eNB side CE agents cooperate by exchanging timestamps and collect the result of the delay measurement. A DL packet from a given TCP flow is enriched with a timestamp by the core side CE agent CN/NE1 (i.e. the central CE agent). The packet with the timestamp is detected by the eNB side CE agent eNB/NE2 which computes the one-way delay as the difference between its clock and the enriched timestamp (assuming that the agents are time-wise synchronized). The eNB side CE agent needs to send the measurement result back by enriching it to an UL TCP packet (usually ACK) that belongs to the same connection so that the core network side CE agent knows which flow the measurement corresponds to (i.e. to the connection carrying the result). Finding the same connection at the eNB side CE agent requires that, similarly to the RTT measurement, the DL and UL packets are correlated based on their IP addresses and TCP port numbers. In an embodiment, however, this requirement may be eliminated by the core side CE agent by providing additional context (besides the timestamp) within the information enriched to the DL packet (as illustrated in FIG. 9). Providing a flow ID that is unique among the flows going through a given eNB enables the eNB side CE agent to send up the S1 one-way delay measurement result along with the flow ID received from the core side CE agent in any of the UL packets, as now the flow ID carries the association of the measurement result and the subject of the measurement (i.e. the flow). The eNB side only stores the [flow ID, measurement result] pair until a suitable UL packet (with sufficient header space for enrichment) is received. This is more lightweight than having to actually correlate the DL and UL packets based on their IP address and port pairs to find a packet from the same flow in the UL direction.

The eNB side CE agent initiates UL S1 delay measurements by enriching a timestamp on its own into suitable UL packets. The scheduling of the measurements (i.e. deciding when to initiate such measurement) normally requires that the eNB side CE agent is executing the same logic as the core side CE agent. In an embodiment, initiating the UL measurements directly follows the frequency of the DL timestamp based measurements as commanded by the core side CE agent, i.e. when eNB sends a one-way delay measurement result to the core side CE agent, eNB extends the enrichment of the result with a timestamp on its own, achieving the same frequency for the UL delay measurements as for the DL delay measurements commanded by the core side CE agent. Thus, a radio network node (e.g. the eNB side CE agent) eNB/NE2 is configured to initiate uplink S1 delay measurements directly following the frequency of downlink timestamp-based measurements as commanded by a core network node CN/NE1; to send a one-way delay measurement result to the core network node; extend the enrichment of the one-way delay measurement result with a timestamp (i.e. the timestamp is added, in addition to the enriched one-way delay measurement value), in order to achieve a same frequency for the uplink S1 delay measurements as for downlink delay measurements commanded by the core network node; to store the latest enriched sequence number per flow identification; to perform loss detection without interpreting TCP/IP protocol headers, wherein data flows are differentiated based on IP address and TCP port pairs; and to indicate a detected loss to the core network node by enriching the flow identification and the detected loss in one or more uplink packets. A core network node (e.g. the core network side CE agent) CN/NE1 is configured to command the radio network node eNB/NE2 to initiate uplink S1 delay measurements; to receive a one-way delay measurement result from the radio network node; to enrich a flow identification and a per-packet sequence number to each downlink packet to assist a radio network node with loss detection; and to receive an indication on a detected loss from the radio network node, the indication comprising an enriched flow identification indication and an enriched detected loss indication in one or more uplink packets.

Detecting the DL packet loss on the S1 interface requires the eNB side CE agent to interpret the TCP level sequence numbers, compute the next expected sequence number based on the packet length indicated in the IP header and detect out-of-order sequences (which indicate lost packets upstream from eNB). In an embodiment, the core side CE agent assists the eNB side CE agent with the loss detection by enriching a flow ID and a per-packet sequence number to each DL packet. The eNB side CE agent then only needs to store the latest enriched sequence number per flow ID and detect the gaps without having to interpret the TCP/IP protocol headers and differentiate flows based on the IP address and TCP port pairs. The detected loss is indicated to the core side CE agent by enriching the flow ID and the detected loss in any of the suitable UL packets (similarly to conveying the DL delay measurement results).

In an embodiment, the core side CE agent is able to limit the measurements to specific flows, application, users, etc. by deciding whether or not to enrich the headers of a given packet, i.e. triggering or bypassing the measurements at the eNB side. As it is the core network side CE agent that executes the logic required for the decision, the eNB side CE agent operates as a lightweight event-driven stateless measurement agent that receives commands from the core side and executes them on the spot. This reduces the complexity and resource utilization of the eNB side CE agent compared to a full blown implementation that follows individual connections on the transport and application protocol levels.

In an embodiment, the header enrichment based in-band communication may use any suitable protocol header with extension possibilities, including TCP, IP, GTP, RTP, etc.

In an embodiment, dynamic responsibility delegation is introduced between the central and distributed measurement agents, e.g. the CE agents. The delegation applies to the analytics tasks for load balancing, and to the analytics and action for the local QoE management.

In an embodiment, the load based analytics responsibility delegation is triggered by the central CE agent based on an explicit threshold on the amount of computational resources (i.e. processor load) allowed to be consumed without obstructing the overall execution capabilities of the node. The central CE agent maintains a list of those peering CE agents that have the capability and free resources to execute the analytics actions for the traffic they monitor. Therefore the distributed CE agents may monitor and report their own load to the central CE agent.

Figure 10:
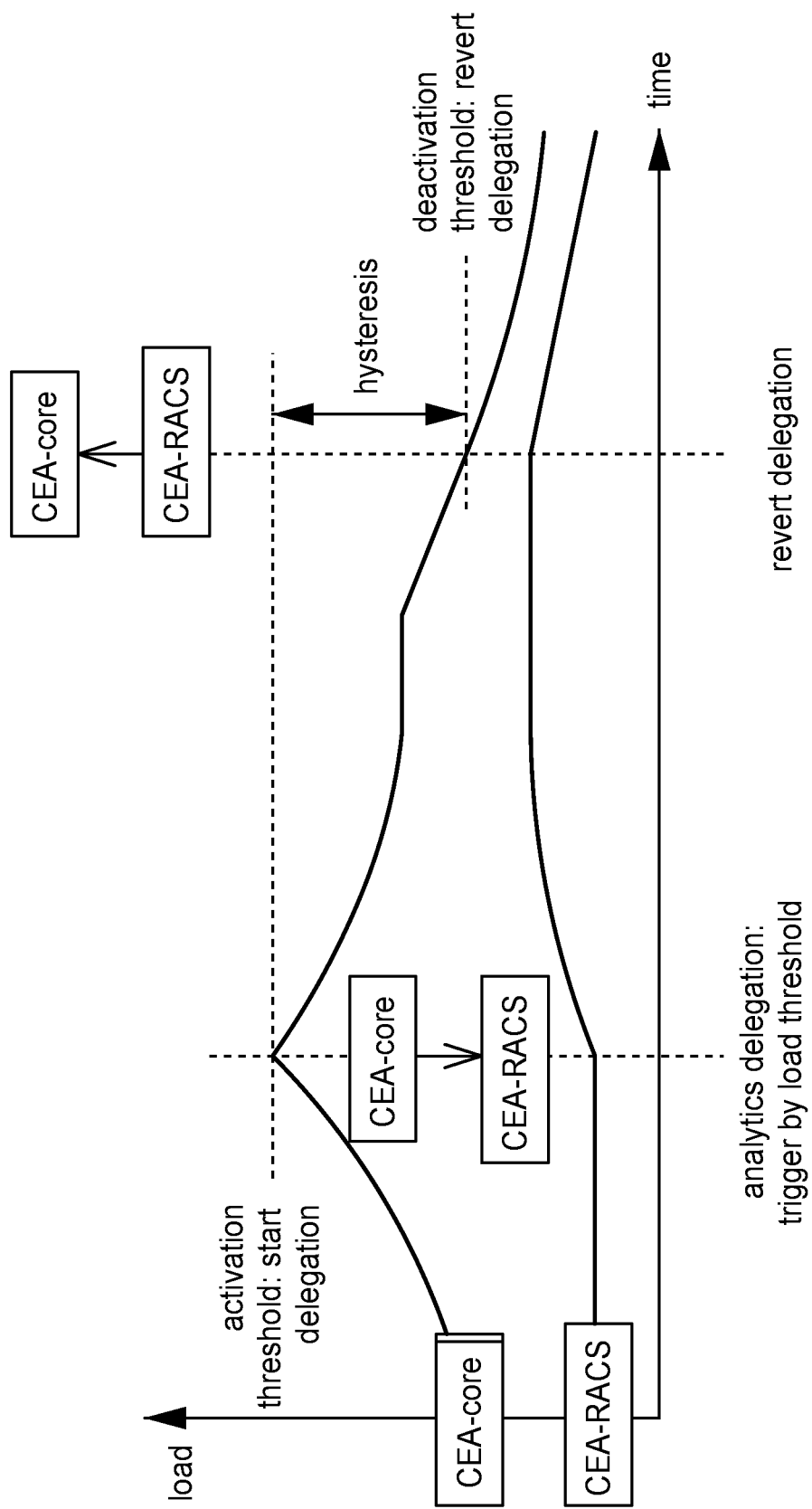
FIG. 10 illustrates load based analytics delegation between CE agents.

In an embodiment, the delegation is started in case the load reaches the activation threshold at the central CE agent. Depending on the load in central CE agent, each suitable distributed CE agent does not necessarily need to take over the analytics task; the delegation is triggered gradually towards an increasing number of CE agents with the objective of keeping the load below the activation threshold. The CE agents that are first offloaded with the analytics task are those that have the lowest load themselves. The delegation is reverted (i.e. the analytics responsibility is transferred back to the central CE agent) in case the load falls under a lower deactivation threshold (hysteresis based delegation management). The process is illustrated between a core network based CE agent and a RACS based CE agent where the available computational resources enable the execution of more complex analytics tasks as well (see FIG. 10). The applicability of the mechanism is not limited to RACS.

In an embodiment, in addition to the delegation of analytics tasks, the central CE agent may also delegate the actions (e.g. the QoE management) in the context of a given network resource to a CE agent that is in a better position to manage the network resource. For example, the QoE enforcement in a radio cell/eNB may be limited by the capacity of an air interface and not by its backhaul (e.g. it has fiber connection or dedicated point-to-point connectivity with resource reservation). In that case, the congested resource is the air interface that may be managed by the eNB/RACS side CE agent more efficiently (due to the lower latency and potentially internal interfaces towards the eNB) than the central CE agent. After the delegation, the core side CE agent supports the eNB/RACS side CE agent with the QoS measurements. The eNB/RACS side CE agent reports its actions to the central CE agent so that it maintains an accurate view on the status of the network and the ongoing actions.

In an embodiment, the delegation may be implemented as a request/response message transaction conveyed in-band on top of existing traffic or in a dedicated off-band control connection. The request contains the responsibilities to be delegated (i.e. analytics only or analytics and actions). The peering entity responds with an acknowledge message confirming the acceptance of the delegation request. The peering entity starts running the analytics at the earliest convenient point of time (e.g. when the first new flow is detected or when enough information is collected for proper analytics). Consequently the results of the analytics are delivered to the central CE agent by using the existing communication means. The first analytics result received by the central CE agent is also an implicit trigger that may stop the execution of the analytics task itself. This mechanism ensures that the analytics is continuously performed in the end-to-end measurement system even during the transition phase.

Figure 11:
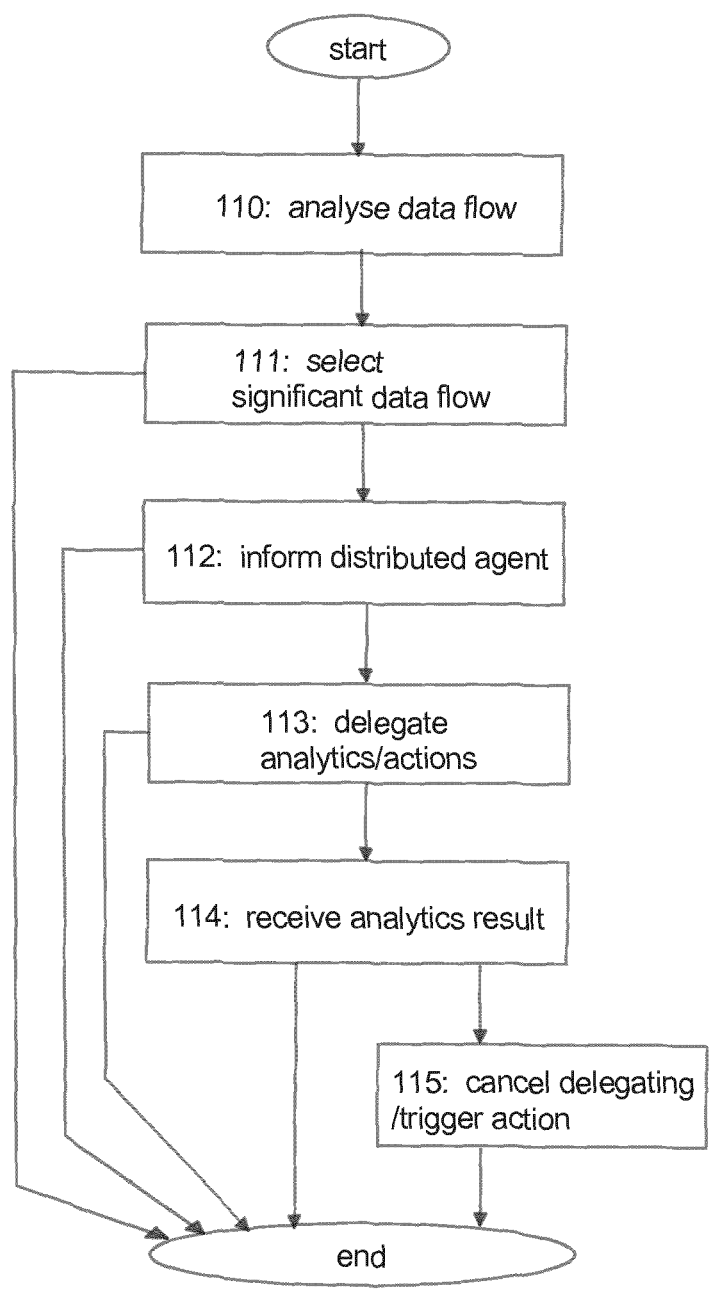
FIG. 11 illustrates a process for measurement coordination according to an embodiment of the invention.

Let us now describe some embodiments with reference to FIG. 11. Referring to FIG. 11, in step 110, a data flow related to an application session for a terminal device, is analysed by a network node NE1 such as a central CE agent. The central CE agent may be a separate entity connected to the network, or the central CE agent may be integrated to another network node (such as SAE-GW in LTE). If, based on the analysing 110, the network node NE1 detects, in step 111, that a data flow has a predefined flow characteristic, the network node NE1 selects 111 the data flow having the predefined characteristic as a significant data flow on which customer experience CE measurements are to be performed. The predefined flow characteristic may include, for example, the large amount of data to be transmitted within the data flow (e.g. multimedia/picture heavy content), long length of the data flow, and/or the flow belonging to an important application. For example, a significant data flow may be detected based on a HTTP response content-length header field that indicates the amount of data of the object to be downloaded next. Alternatively, a significant data flow may be detected based the web page or the type of the web page (e.g. multimedia/picture heavy content).

In item 112, the network node NE1 may inform another network node (other network nodes) NE2 (such as distributed CE agent(s)) on the significant data flow(s) on which customer experience CE measurements are to be performed. The informing may include, for example, the network node NE1 marking (e.g. enriching) respective packets or flows. In item 112, the network node NE1 may also provide information such as traffic monitoring information, protocol level packet interpretation information, measurement context detection information, measurement scheduling information, and/or measurement execution information to the distributed CE agent(s), in order the distributed CE agent(s) NE2 to be able to perform relevant customer experience CE measurements.

In item 113, the network node NE1 may (statically or dynamically) delegate analytics responsibilities among CE agents to balance computational load. In item 113, the network node NE1 may also delegate actions and analytics responsibilities to distributed CE agents in order local QoS management, QoE management, traffic management, congestion control etc. to be performed at the proximity of managed resources. In step 114, the network node NE1 may receive, from the distributed CE agent, information on analytics or actions. In step 115, the network node NE1 may, based on the receiving, trigger a QoE management action in the central CE agent, or cancel delegation of the actions and/or analytics responsibilities to the distributed CE agent.

As illustrated in FIG. 11, steps 112 to 115 are optional.

Figure 12:
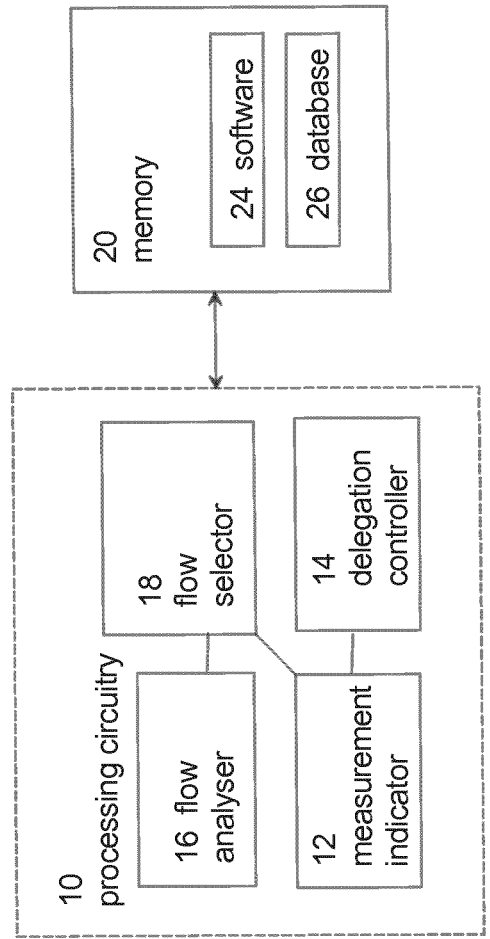
FIG. 12 illustrates a blocks diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described network element or the network node. The at least one processor, the at least one memory, and the computer program code may thus be considered as an embodiment of means for executing the above-described procedures of the network element or the network node. FIG. 12 illustrates a block diagram of a structure of such an apparatus. The apparatus may be comprised in the network element or in the network node, e.g. the apparatus may form a chipset or a circuitry in the network element or in the network node. In some embodiments, the apparatus is the network element or the network node. The apparatus comprises a processing circuitry 10 comprising the at least one processor. The processing circuitry 10 may comprise a flow analyser 16 configured to analyse a data flow related to an application session. The data flow analyser 16 may be configured to detect the data flow related to the application session, as described above, and output information on the data flow to a flow selector 18. The flow selector 18 is configured to select significant data flows on which customer experience CE measurements are to be performed. The apparatus may further comprise a measurement indicator 12 configured to provide CE measurement information to the CE measurement agents. A delegation controller 14 is configured to statically or dynamically delegate actions and/or analytics responsibilities to the CE measurement agents.

The processing circuitry 10 may comprise the circuitries 12 to 18 as sub-circuitries, or they may be considered as computer program modules executed by the same physical processing circuitry. The memory 20 may store one or more computer program products 24 comprising program instructions that specify the operation of the circuitries 12 to 18. The memory 20 may fur-their store a database 26 comprising definitions for measurement coordination, for example. The apparatus may further comprise a communication interface (not shown in FIG. 12) providing the apparatus with radio communication capability with the terminal devices. The communication interface may comprise a radio communication circuitry enabling wireless communications and comprise a radio frequency signal processing circuitry and a baseband signal processing circuitry. The baseband signal processing circuitry may be configured to carry out the functions of a transmitter and/or a receiver. In some embodiments, the communication interface may be connected to a remote radio head comprising at least an antenna and, in some embodiments, radio frequency signal processing in a remote location with respect to the base station. In such embodiments, the communication interface may carry out only some of radio frequency signal processing or no radio frequency signal processing at all. The connection between the communication interface and the remote radio head may be an analogue connection or a digital connection. In some embodiments, the communication interface may comprise a fixed communication circuitry enabling wired communications.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 12 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

3GPP 3rd generation partnership project
AMBR aggregated maximum bit rate
AP access point
ARP allocation and retention priority
BTS base station
CDN content delivery network
CE customer experience
CEM customer experience management
CmCH-PI common channel priority indicator
CN core network
CSV comma separated values
DL downlink
DRT delay reference time
DSCP differentiated services code point
ECGI evolved cell global identifier
eNB evolved node-B
FCO flexi content optimizer
FP frame protocol
FSN frame sequence number
FTP file transfer protocol
GBR guaranteed bit rate
GPRS general packet radio service
GPS global positioning system
GTP GPRS tunnelling protocol
HE header enrichment
HSDPA high speed downlink packet access
HSPA high speed packet access
HSUPA high speed uplink packet access
HTTP hypertext transfer protocol
HTTPS hypertext transfer protocol secure
IMSI international mobile subscriber identity
IP internet protocol ISP internet service provider
KPI key performance indicator
LTE long term evolution
MBR maximum bit rate
MME mobility management entity
MSS maximum segment size
NTP network time protocol
OWAMP one way active measurement protocol
PCEF policy and charging enforcement function
PCRF policy and charging rules function
PHB per-hop behaviour
PTP precision time protocol
QoE quality of experience
QoS quality of service
RACS radio application could server
RACS-C RACS in the core
SDN software defined networking
RNC radio network controller
SPI scheduling priority index
RRC radio resource control
RTT round trip time
SAE-GW service architecture evolution gateway
SCTP stream control transmission protocol
SON self organizing network
TCP transmission control protocol
TFT traffic flow template
TLS transport layer security
TWAMP two way active measurement protocol
UDP user datagram protocol
UE user equipment
UL uplink
UPCON user plane congestion management
VoIP voice over IP
ID identification

The invention claimed is:

1. A method of comprising:
analysing, in a network node, data flows related to a terminal device of a communication system, in order to detect data flows having at least one predefined characteristic;
selecting, in the network node, the data flows having the at least one predefined characteristic as significant data flows on which customer experience CE measurements are to be performed;
limiting a number of the customer experience CE measurements of individual packets of a flow according to an accuracy target defined for the flow; and
dynamically delegating, in the network node, analytics responsibilities among measurement agents to balance computational load.

2. A method as claimed in claim 1, the method comprising, in the network node, based on the selecting, commanding measurement agents to perform customer experience CE measurements on one or more significant data flows, by marking respective packets or flows.

3. A method as claimed in claim 1, wherein the accuracy target indicates the number of measurement samples to be collected from the flow during a given measurement time window, and wherein the customer experience CE measurements are distributed evenly in time during the measurement time window.

4. A method as claimed in claim 1, the method comprising, in the network node, one or more of
introducing a target number of measurement samples per flow, introducing a target number of measurement samples per bearer, introducing the target number of the measurement samples per application, introducing the target number of the measurement samples per QCI class, introducing the target number of the measurement samples per DSCP class, per cell, and introducing the target number of the measurement samples per base station.

5. A method as claimed in claim 1, the method comprising, in the network node, delegating actions and analytics responsibilities to distributed measurement agents in order one or more of
local QoS management, QoE management, traffic management, and congestion control,
to be performed at the proximity of managed resources.

6. A method as claimed in claim 1, the method comprising, in the network node,
receiving, from a distributed measurement agent, information on an analytics result; and
based on the receiving, triggering QoE management actions in a central measurement agent.

7. A method as claimed in claim 1, the method comprising, in the network node, providing one or more of
traffic monitoring information, protocol level packet interpretation information, measurement context detection information, measurement scheduling information, and measurement execution information,
from a central measurement agent to one or more distributed measurement agents, in order the distributed measurement agent to be able to perform relevant customer experience CE measurements.

8. A method as claimed in claim 1, the method comprising, in the network node,
receiving, from a distributed measurement agent, analytics and actions information; and
based on the receiving, if needed, cancelling delegation of one or more of actions responsibilities and analytics responsibilities to the distributed measurement agent.

9. A method as claimed in claim 1, the method comprising, in the network node,
commanding a radio network node to initiate uplink delay measurements;
receiving a delay measurement result from the radio network node;
enriching a flow identification and a per-packet sequence number to each downlink packet to assist a radio network node with loss detection; and
receiving an indication on a detected loss from the radio network node, the indication comprising an enriched flow identification indication and an enriched detected loss indication in one or more uplink packets.

10. An apparatus comprising:
at least one processor; and
at least one memory including a computer program code, wherein the at least one memory and the computer program code are configured, with the at least one processor, to cause the apparatus to
analyse data flows related to a terminal device of a communication system, in order to detect data flows having at least one predefined characteristic;
select the data flows having the at least one predefined characteristic, as significant data flows on which customer experience CE measurements are to be performed; and
limit a number of the customer experience CE measurements of individual packets of a flow according to an accuracy target defined for the flow; and
dynamically delegate analytics responsibilities among measurement agents to balance computational load.

11. An apparatus as claimed in claim 10, wherein the at least one memory and the computer program code are configured, with the at least one processor, to cause the apparatus to, based on the selecting, command measurement agents to perform customer experience CE measurements on one or more significant data flows, by marking respective packets or flows.

12. An apparatus as claimed in claim 10, wherein the at least one memory and the computer program code are configured, with the at least one processor, to cause the apparatus to limit the number of the customer experience CE measurements of individual packets of the flow according to an accuracy target defined for the flow, the accuracy target indicating the number of measurement samples to be collected from the flow during a given measurement time window, wherein the customer experience CE measurements are distributed evenly in time during the measurement time window.

13. An apparatus as claimed in claim 10, wherein the at least one memory and the computer program code are configured, with the at least one processor, to cause the apparatus to perform one or more of
introducing a target number of measurement samples per flow, introducing a target number of measurement samples per bearer, introducing the target number of the measurement samples per application, introducing the target number of the measurement samples per QCI class, introducing the target number of the measurement samples per DSCP class, introducing the target number of the measurement samples per cell, and introducing the target number of the measurement samples per base station.

14. An apparatus as claimed in claim 10, wherein the at least one memory and the computer program code are configured, with the at least one processor, to cause the apparatus to delegate actions and analytics responsibilities to distributed measurement agents in order one or more of
local QoS management, QoE management, traffic management, and congestion control,
to be performed at the proximity of managed resources.

15. An apparatus as claimed in claim 10, wherein the at least one memory and the computer program code are configured, with the at least one processor, to cause the apparatus to
receive, from a distributed measurement agent, information on an analytics result; and
based on the receiving, trigger QoE management actions in a central measurement agent.

16. An apparatus as claimed in claim 10, wherein the at least one memory and the computer program code are configured, with the at least one processor, to cause the apparatus to provide one or more of
traffic monitoring information, protocol level packet interpretation information, measurement context detection information, measurement scheduling information, and measurement execution information,
from a central measurement agent to one or more distributed measurement agents, in order the distributed measurement agent to be able to perform relevant customer experience CE measurements.

17. An apparatus as claimed in claim 10, wherein the at least one memory and the computer program code are configured, with the at least one processor, to cause the apparatus to
receive, from a distributed measurement agent, analytics and actions information; and
based on the receiving, if needed, cancel delegation of one or more of actions responsibilities and analytics responsibilities, to the distributed measurement agent.

18. An apparatus as claimed in claim 10, wherein the at least one memory and the computer program code are configured, with the at least one processor, to cause the apparatus to
command a radio network node to initiate uplink delay measurements;
receive a delay measurement result from the radio network node;
enrich a flow identification and a per-packet sequence number to each downlink packet to assist a radio network node with loss detection; and
receive an indication on a detected loss from the radio network node, the indication comprising an enriched flow identification indication and an enriched detected loss indication in one or more uplink packets.

19. A computer program product embodied on a non-transitory distribution medium readable by a computer and comprising program instructions which, when loaded into the computer, execute a computer process comprising causing a network node to
analyse data flows related to a terminal device of a communication system, in order to detect data flows having a predefined characteristic;
select the data flows having the predefined characteristic as significant data flows on which customer experience CE measurements are to be performed; and
limit a number of the customer experience CE measurements of individual packets of a flow according to an accuracy target defined for the flow; and
dynamically delegate analytics responsibilities among measurement agents to balance computational load.

* * * * *